Sept. 23, 1969  R. BITZER  3,468,139
KNITTED PILE FABRIC AND METHOD OF MAKING THE SAME
Filed March 6, 1968  22 Sheets-Sheet 1

Inventor:
Roland Bitzer
By Michael S. Striker
Attorney

Sept. 23, 1969    R. BITZER    3,468,139
KNITTED PILE FABRIC AND METHOD OF MAKING THE SAME
Filed March 6, 1968    22 Sheets-Sheet 2

Inventor:

Sept. 23, 1969 R. BITZER 3,468,139
KNITTED PILE FABRIC AND METHOD OF MAKING THE SAME
Filed March 6, 1968 22 Sheets-Sheet 2

Inventor:

Sept. 23, 1969   R. BITZER   3,468,139
KNITTED PILE FABRIC AND METHOD OF MAKING THE SAME
Filed March 6, 1968   22 Sheets-Sheet 4

Inventor:

Sept. 23, 1969  R. BITZER  3,468,139
KNITTED PILE FABRIC AND METHOD OF MAKING THE SAME
Filed March 6, 1968  22 Sheets-Sheet 5

Inventor:

Sept. 23, 1969  R. BITZER  3,468,139
KNITTED PILE FABRIC AND METHOD OF MAKING THE SAME
Filed March 6, 1968  22 Sheets-Sheet 6

Inventor:

Sept. 23, 1969        R. BITZER        3,468,139
KNITTED PILE FABRIC AND METHOD OF MAKING THE SAME
Filed March 6, 1968                    22 Sheets-Sheet 7

Inventor:

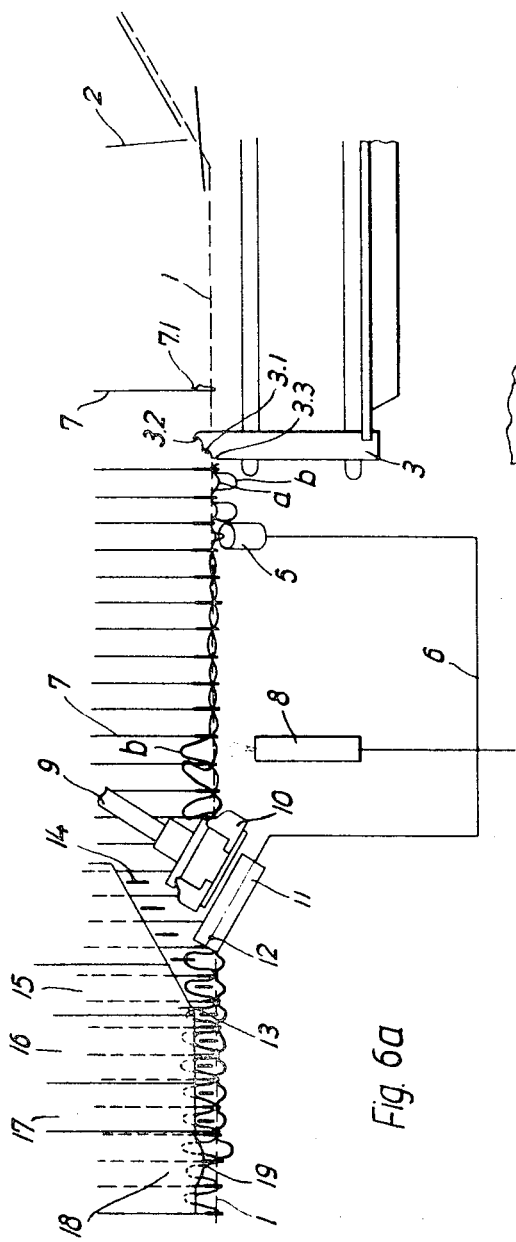
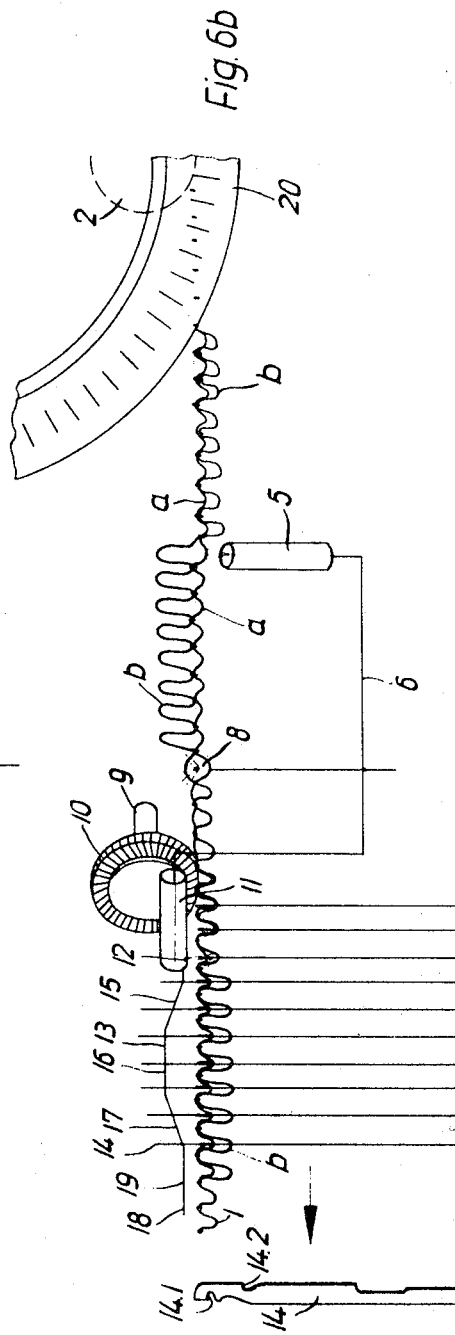
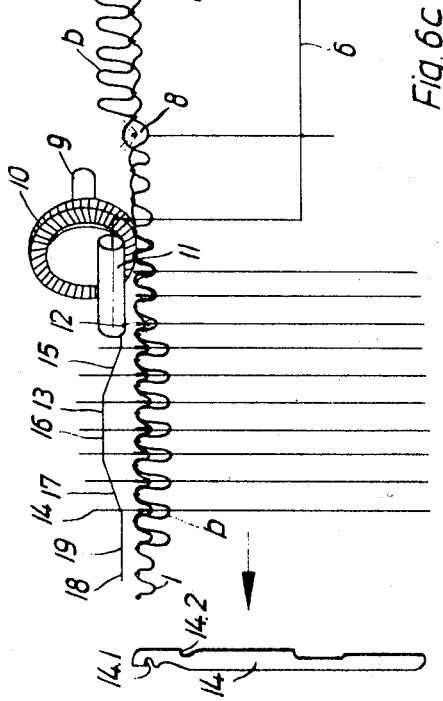

Inventor:

Sept. 23, 1969     R. BITZER     3,468,139
KNITTED PILE FABRIC AND METHOD OF MAKING THE SAME
Filed March 6, 1968     22 Sheets-Sheet 10
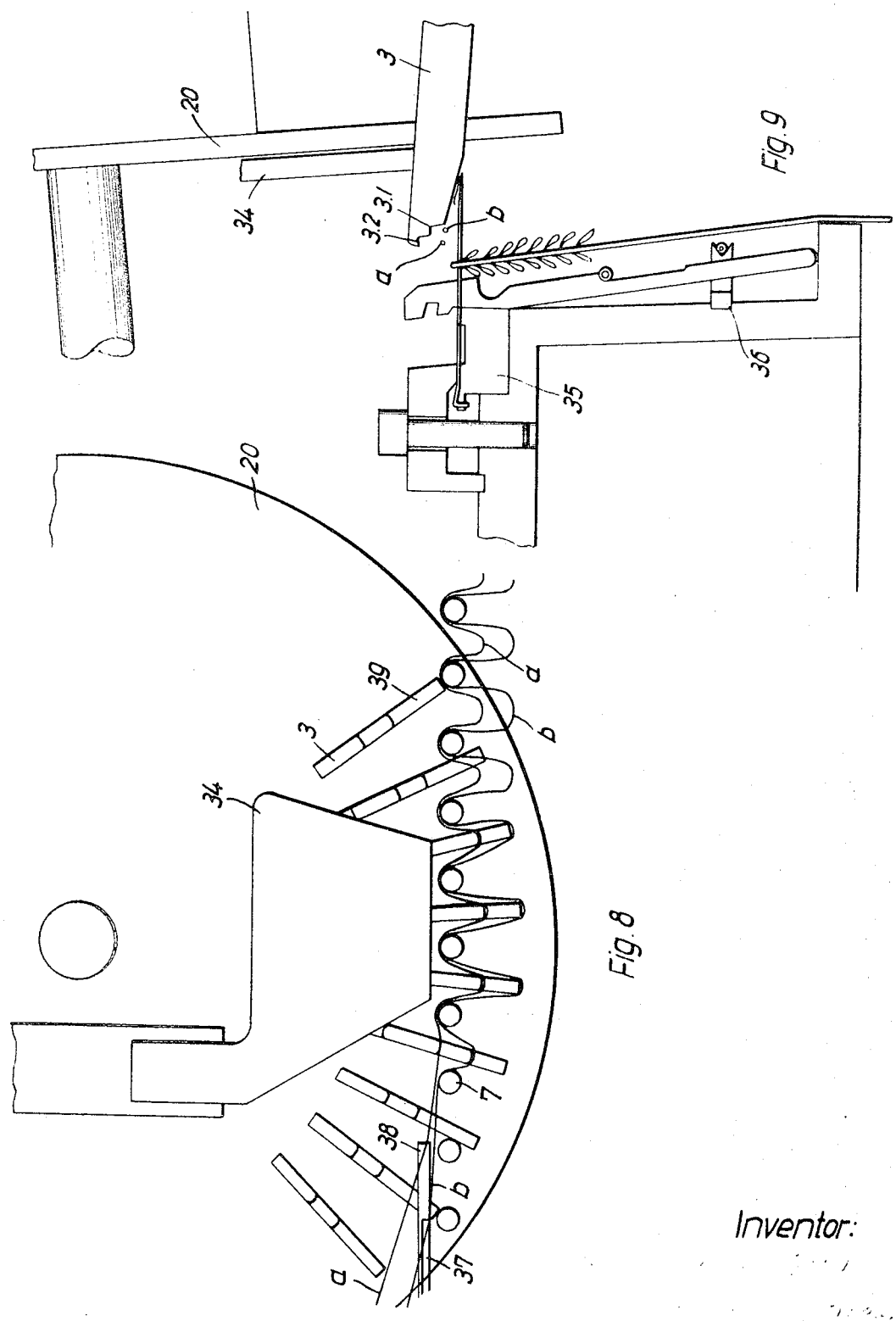
Inventor:

Inventor:

Sept. 23, 1969   R. BITZER   3,468,139
KNITTED PILE FABRIC AND METHOD OF MAKING THE SAME
Filed March 6, 1968   22 Sheets-Sheet 12

Inventor:

Inventor:

Sept. 23, 1969  R. BITZER  3,468,139
KNITTED PILE FABRIC AND METHOD OF MAKING THE SAME
Filed March 6, 1968  22 Sheets-Sheet 14

Inventor:

Sept. 23, 1969    R. BITZER    3,468,139
KNITTED PILE FABRIC AND METHOD OF MAKING THE SAME
Filed March 6, 1968    22 Sheets-Sheet 15

Inventor:

Sept. 23, 1969 R. BITZER 3,468,139
KNITTED PILE FABRIC AND METHOD OF MAKING THE SAME
Filed March 6, 1968 22 Sheets-Sheet 18
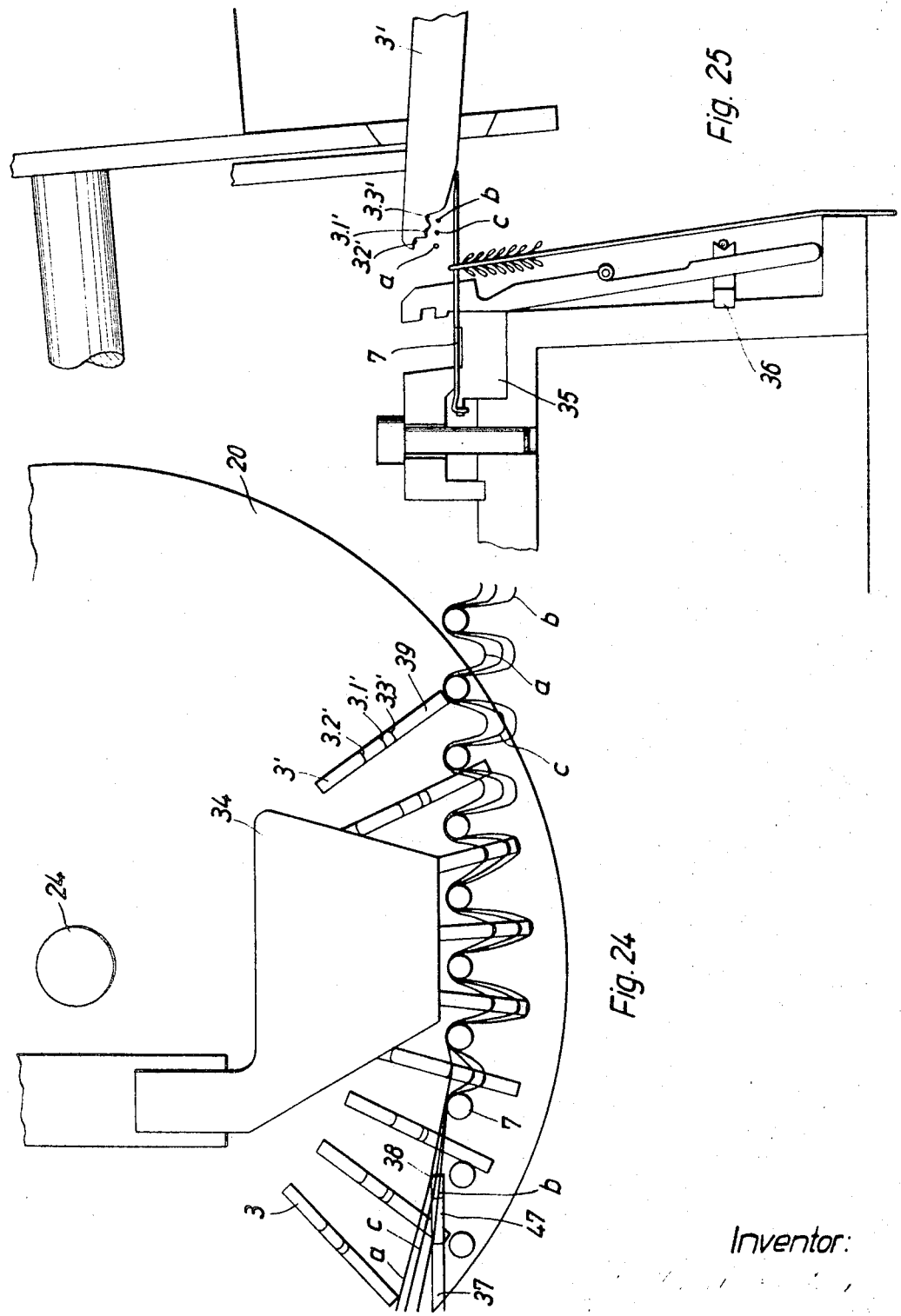
Inventor:

Sept. 23, 1969  R. BITZER  3,468,139
KNITTED PILE FABRIC AND METHOD OF MAKING THE SAME
Filed March 6, 1968  22 Sheets-Sheet 19

Inventor:

Sept. 23, 1969 R. BITZER 3,468,139
KNITTED PILE FABRIC AND METHOD OF MAKING THE SAME
Filed March 6, 1968 22 Sheets-Sheet 20

Inventor:
Roland Bitzer
By Michael S. Striker
Attorney

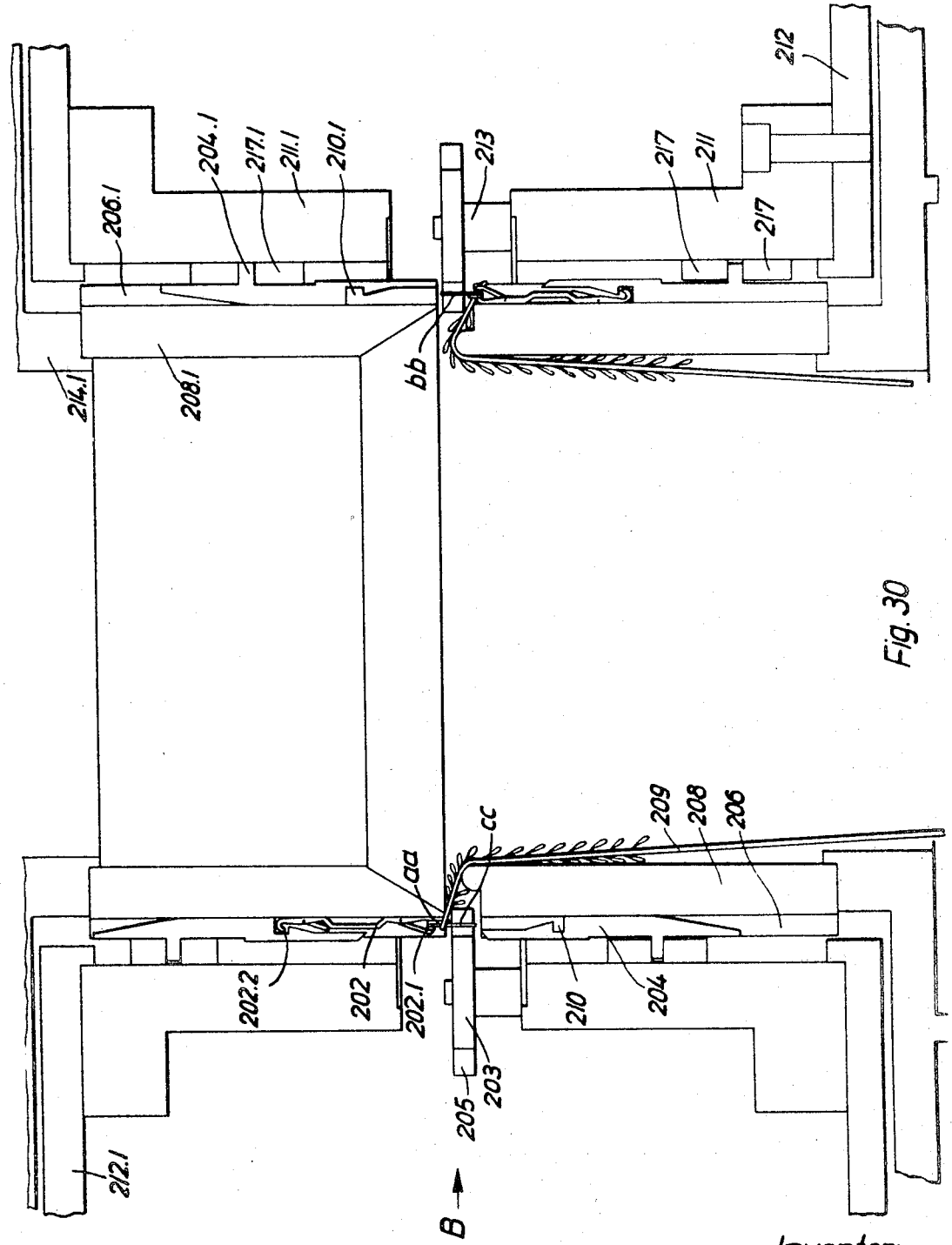

3,468,139
KNITTED PILE FABRIC AND METHOD
OF MAKING THE SAME
Roland Bitzer, Tailfingen, Wurttemberg, Germany
Continuation-in-part of application Ser. No. 433,627,
Feb. 18, 1965. This application Mar. 6, 1968, Ser.
No. 710,921
Int. Cl. D04b 11/08
U.S. Cl. 66—194                                    11 Claims

ABSTRACT OF THE DISCLOSURE

Pile stitches are knitted together with the stitches of a base fabric to be firmly attached to the same, and have sinker loops turned from the front to the back of the base fabric for forming a pile on the same, and held on the back of the base fabric by sinker loops of the base stitches. The pile forming sinker loops are turned from the front to the back of the fabric by jets of air.

CROSS-REFERENCE TO A RELATED APPLICATION

The present invention is a continuation-in-part application of my copending application Ser. No. 433,627, filed Feb. 18, 1965, and now abandoned, entitled "Knitted Terry Fabric."

BACKGROUND OF THE INVENTION

The present invention relates to an improvement of knitted pile fabrics, and to a method of making a pile fabric.

Pile fabrics constructed in accordance with the prior art have the disadvantage that the pile yarns are only loosely held in the base fabric and can be pulled out.

Another disadvantage of pile fabric in accordance with the prior art is that it has to be produced on machines in which two needles are provided for each needle channel, so that only heavy fabrics can be knitted.

SUMMARY OF THE INVVENTION

It is one object of the invention to produce improved pile fabrics in which the pile yarns are firmly held in the base fabric and cannot be pulled out.

Another object of the invention is to produce pile fabrics in which the needle loops of the pile stitches are superimposed on needle loops of stitches of the base fabric, and are held by the next following needle loop of the base fabric in the same wale.

Another object of the invention is to provide a method for turning pile forming sinker loops from one side of the base fabric to the other side of the same for the purpose of forming the pile on the other side.

With these objects in view, a knitted pile fabric according to the invention comprises a base fabric having courses of knitted base stitches, at least one row of pile stitches, each pile stitch having an anchoring needle loop disposed on one side of the needle loop and on the other side of the sinker loop part of a base stitch and having sinker loops and legs connecting the sinker loops with the anchoring needle loops and passing through a base stitch in such a direction that the last portion of the base stitch crossing the legs of the pile stitches is located on one side of the base fabric and holds the sinker loops of the pile stitches on the other side of the same for forming a pile.

The courses of the base stitches form groups including first, second and third courses which are associated with at least one row of pile stitches. The anchoring loop of each pile stitch is disposed, together with the needle loop of a base stitch of the second course, on one side of a needle loop and on the other side of the sinker loop parts of a base stitch of the first course, and the legs of the pile stitches pass through the needle loops of base stitches of the third course.

In the preferred embodiment of the invention, the sinker loops of the base stitches of the second course cross the legs of the sinker loops of the respective pile stitches on one side and are the last portions of the base stitch crossing the respective pile stitch for holding the sinker loops of the same on the other side of the base fabric for forming a pile.

The needle loops of the base stitches and the anchoring needle loops of the pile stitches project in one direction, and the sinker loops of the pile stitches, which form the pile, project in the opposite direction along the wales of the base fabric.

A modified pile fabric of the invention has piles on both sides of the base fabric, and both pile yarns are firmly knitted together with the base fabric so that they cannot be pulled out. It is advantageous to form alternate rows of pile stitches of two pile yarns so that alternate courses of base stitches hold rows of pile stitches whose sinker loops alternately form piles on both sides of the fabric.

The pile loops may be cut open, shorn, or roughened, if desired.

It is advantageous to use a base fabric having alternating knit and purl stitches for anchoring pile stitches. The number and arrangement of the knit and purl stitches can be varied in various manners for producing different patterns.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 6a is a fragmentary developed schematic plan view illustrating apparatus for making the pile stitches described particularly with reference to FIG. 1;

FIG. 6b is a fragmentary developed elevation of the apparatus of FIG. 6a;

FIG. 6c is an elevation illustrating a knock-over bit used in the apparatus of FIG. 6a;

FIG. 8 is a fragmentary enlarged view illustrating a sinker wheel arrangement as viewed in the direction of the arrow A in FIG. 7;

FIG. 9 is a fragmentary enlarged radial sectional view of the apparatus of FIG. 8;

FIG. 24 is a fragmentary view illustrating a sinker wheel as shown in FIG. 8, provided with modified sinkers and yarn guides for making a pile fabric according to the invention having piles on both sides;

FIGS. 25 to 29 are vertical sectional views illustrating successive operational positions during the knitting of a pile fabric with piles on both sides;

FIG. 30 is a fragmentary vertical sectional view illustrating a circular knitting machine for making the pile fabric of FIG. 5.

DESCRIPTION OF THE PREFERRED EMBODIMENTS

Figure 1:
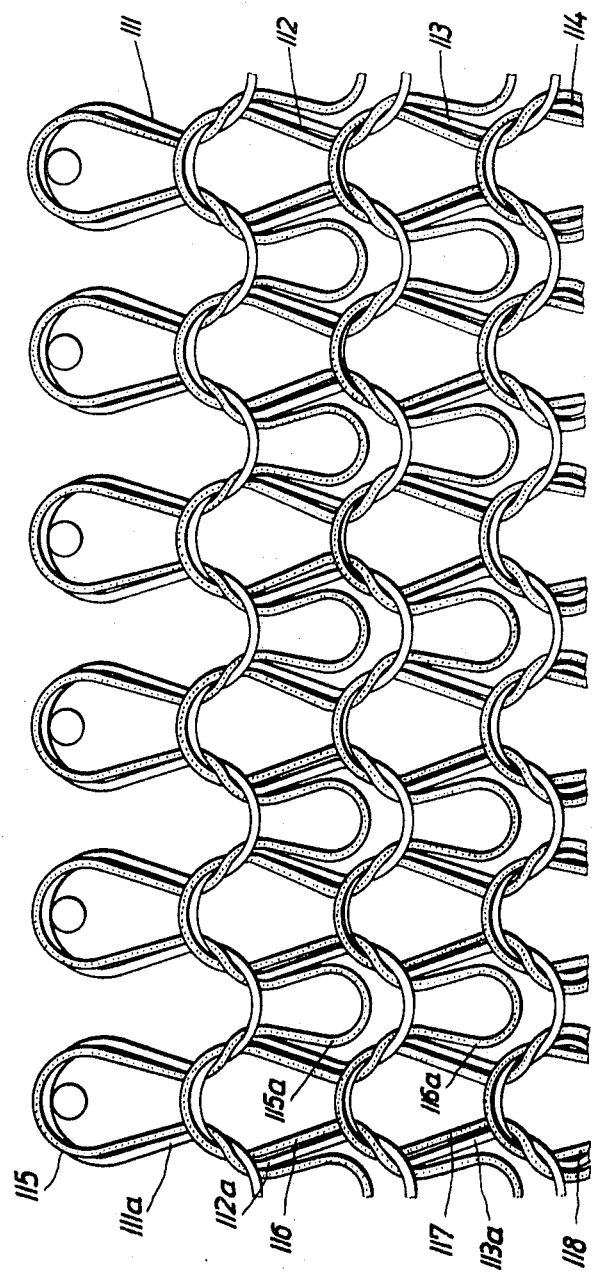
FIG. 1 is a schematic view illustrating a pile fabric according to one embodiment of the invention in which the pile is formed on the right side of the fabric.
Figure 1A:
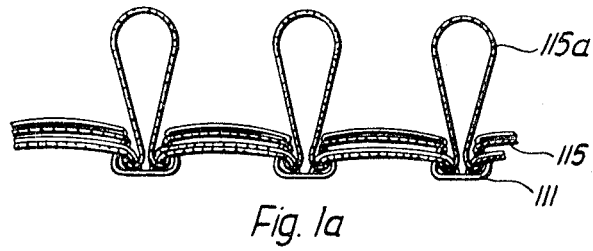
FIG. 1a is a fragmentary end view of the fabric of FIG. 1.

Referring first to the knitted pile fabric of the embodiment illustrated in FIGS. 1 and 1a, a plain knitted fabric consists of courses respectively consisting of base stitches 111, 112, 113, 114. Rows of pile stitches 115 to 118 are knit to the courses of the base fabric, respectively, and form sinker loops 115a, 116a and so forth which form a pile, all pile-forming sinker loops being located on the same side of the base fabric.

Referring particularly to one pile stitch 116, the same is connected with three base stitches 111, 112, 113 of a group of courses of the base fabric. The needle loop of pile stitch 116 is disposed, together with the needle loop 112a of the second course on one side of the needle loop 111a of the first course, and on the other side of the sinker loop part of the respective base stitch 111. The legs of pile stitch 116 are located on the other side of the needle loop 113a of a base stitch 113 in the same wale and then pass into the sinker loops of the base stitch 112 of the second course to the other side where its pile sinker loop 116a is located. Consequently, a sinker loop of the base fabric is the last portion of the same crossing the legs of the respective pile stitch on one side of the fabric, so that the pile forming sinker loop is reliably held projecting from the other side of the fabric, and forming a pile on the same.

Each pile stitch is associated in the above described manner with three base stitches of a group of three course of the base fabric, however, the groups of three base course overlap, and a row of pile stitches is associated with each course of base stitches.

The pile is formed on the right side of the knitted base fabric so that the left side is available for chaineuse yarns.

FIG. 1a shows pile sinker loops 115a corresponding to the pile sinker loops 116a explained above, projecting from the right side of the plain base fabric and held by the sinker loop of the base stitch 111. The side of the fabric from which the pile projects, as described above, may be referred to as the back of the fabric, and it will be seen that in the embodiment of FIGS. 1 and 1a, the front of the fabric has no pile.

As will be described hereinafter in greater detail, the needle loops of the pile stitches and base stitches are simultaneously formed by means of bearded needles, and the old loops are taken off the needles during the press off of the beards. Shortly before the knock off, the sinker loops of the pile stitches are turned by jets of air so that the pile stitches are still located on the needles in front of the fabric, but are turned to the back of the fabric. After the following knocking over of the old loops, the pile stitches are firmly knit into the base fabric and project to the rear of the same.

A machine for producing the pile loops described with reference to FIG. 1, will be described with reference to FIGS. 6 to 29.

The pile fabric described with reference to FIG. 1 has a pile only at the back of the fabric, but the front of the fabric can be varied in several ways.

Figure 2A:
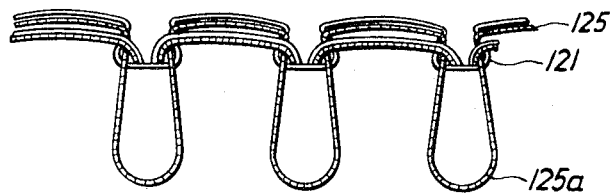
FIG. 2a is a section of the pile fabric shown in FIG. 2 and taken in the first course.
Figure 2:
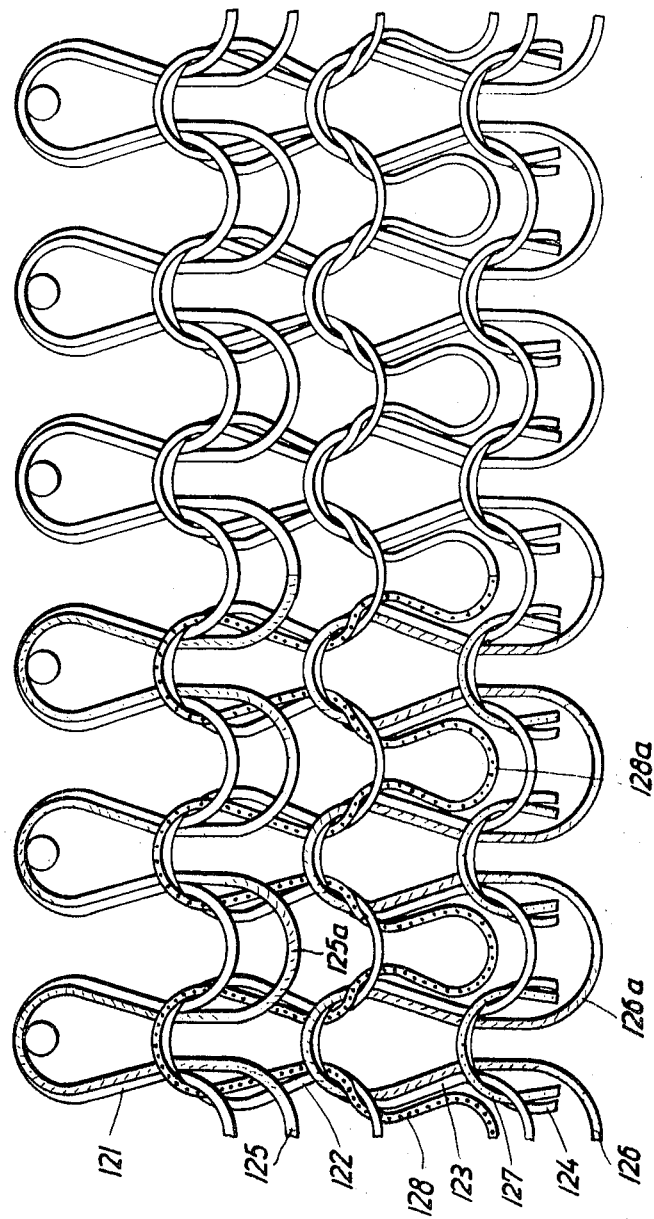
FIG. 2 is a schematic view illustrating a pile fabric according to a second embodiment of the invention in which piles are formed on both sides of the base fabric.

A modified pile fabric according to the invention is illustrated in FIGS. 2 and 2a. The base fabric consists of courses of base stitches 121 to 124. Pile stitches 127, 128 of the type described with reference to FIG. 1 are knit to every second course of base stitches, and have sinker loops located on the back of the fabric. For example, the sinker loop of pile stitch 128 is held by the sinker loop of base stitch 122 which is located on the front of the fabric and is the last portion of base stitch 122 crossing the legs of the sinker loop of pile stitch 128 so that the same is held on the back of the fabric, and all corresponding sinker loops form a pile on the back of the fabric which, however, is thinner than the pile of the embodiment of FIG. 1 since a row of pile loops is formed on the back of the fabric only for every alternate course of base stitches.

In the embodiment of FIG. 2, a pile is also formed on the front of the fabric by pile stitches 125, 126 which are respectively correlated with the remaining other alternate courses of base stitches, 121, 123. The needle loops of base stitches 123 and of pile stitches 126, for example, are superimposed, and the legs of the pile stitches pass on the back of the fabric under the needle loops of base stitches 124 and pile stitches 127 so that the sinker loops 126a are located on the front of the fabric, as are the sinker loops 125a of the next following row of pile stitches 125. Consequently, rows of different pile forming sinker loops are staggered on the front and back of the fabric.

FIG. 2a illustrates the pile-forming projecting sinker loops 125a on the front of the fabric, while the pile at the back of the fabric with sinker loops of pile stitches 128 could be represented by a figure corresponding to FIG. 1a. In the embodiment of FIG. 2, the pile-forming sinker loops project in opposite direction.

The pile fabric according to FIG. 2 is very elastic due to the fact that pile stitches of the type first explained with reference to FIG. 1 are provided only in every second course of the base fabric in the embodiment of FIG. 2.

Figure 3A:
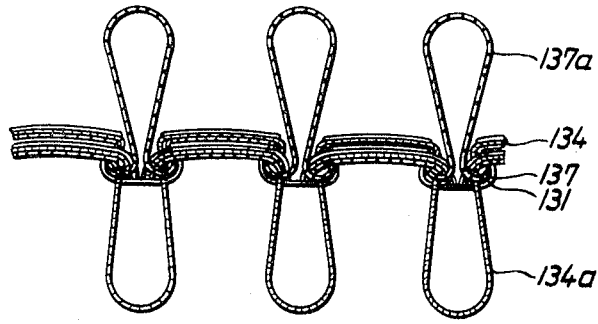
FIG. 3a is an end view of the pile fabric shown in FIG. 3.
Figure 3:
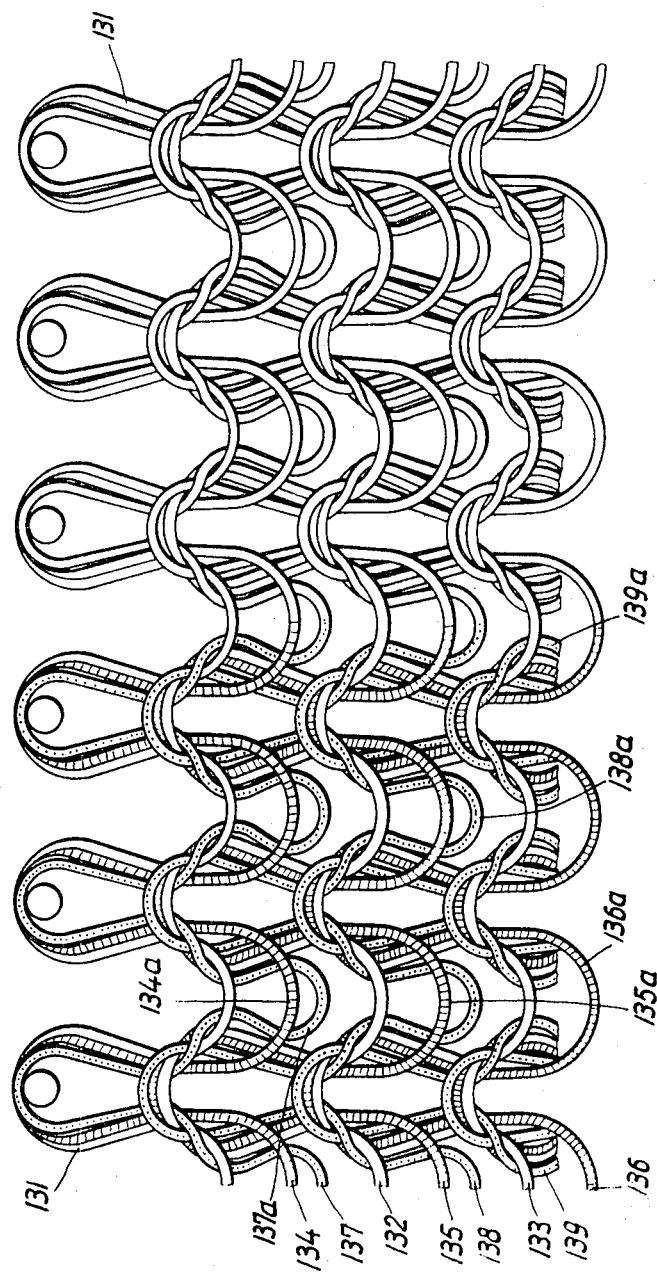
FIG. 3 is a schematic view illustrating a pile fabric according to a third embodiment of the invention with different piles on opposite sides of the base fabric.

The embodiment of FIGS. 3 and 3a combines features of the embodiments of FIGS. 1 and 2, and has a particularly soft feel so that it is very well suited for toweling and warm underwear.

Three courses of base stitches 131, 132, 133 of the plain base fabric are shown. Pile yarns 134, 135, 136 form a pile on the front of the fabric, and pile yarns 137, 138, 139 form a pile on the back of the fabric. A row of pile stitches having sinker loops 134a, 135a, 136a in front of the fabric is knit to each course of the base fabric. A row of pile stitches as described with reference to FIG. 1 is also correlated with each course of base stitches. Consequently, the pile loops 137a, 138a, 139a project from the back of the fabric forming a pile thereon. The sinker loops of the base stitches of each course cross the legs of the sinker loops 137a, 138a, 139a in front of the same so that the respective sinker loops are firmly held on the back of the fabric for forming a pile thereon, as described with reference to FIG. 1. Needle loops of three yarns are superimposed, and have legs passing through three other superimposed needle loops. For example, the needle loops of yarns 131, 134, and 137 are superimposed and formes together, and pass through three needle loops of yarns 132, 135, and 138. All yarns, namely the base yarn, and the two pile yarns are simultaneously formed into loops, as will be described hereinafter, but after the loops are formed, the sinker loops 137a, 138a, 139a which are to form a pile on the back of the fabric, are turned from the front of the fabric to the back. FIG. 3a shows pile loops 137a at the back of the fabric, and pile loops 134a on the front of the same. Since front and rear pile loops are formed on each course of the base fabric, the rows of pile loops register.

Figure 4:
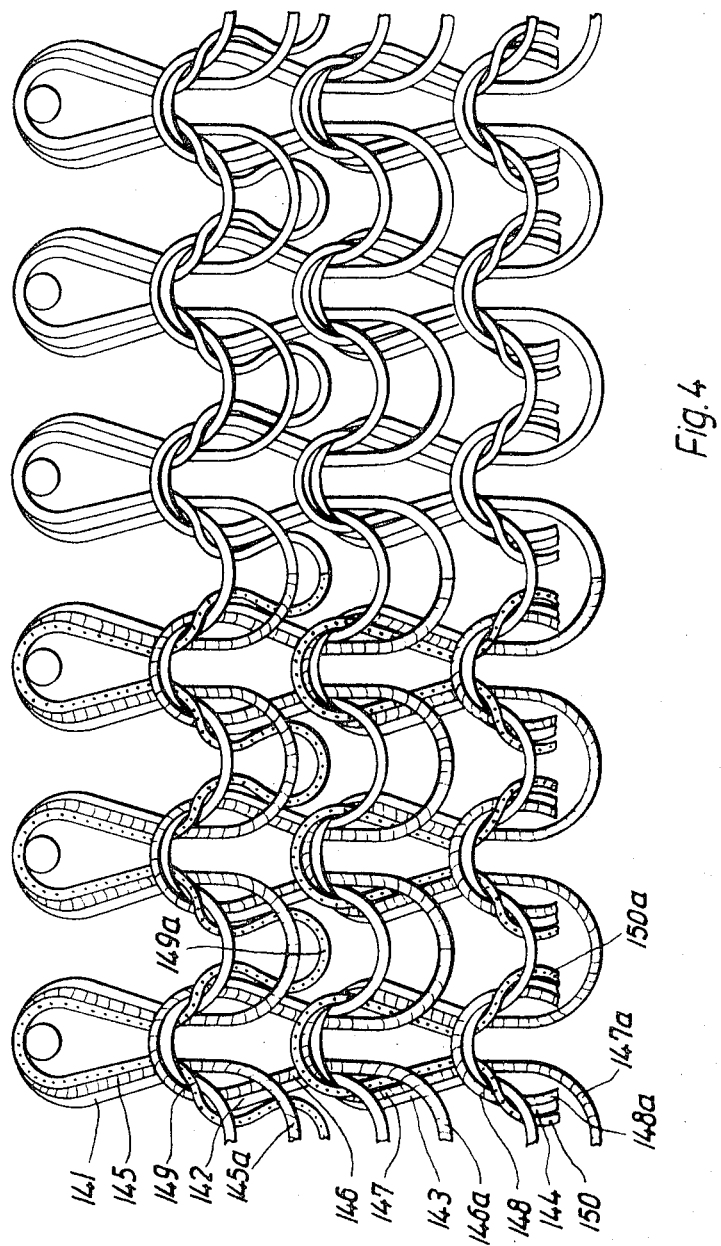
FIG. 4 is a schematic view illustrating a pile fabric according to a fourth embodiment of the invention with different piles on both sides of the base fabric.

A modified pile fabric is illustrated in FIG. 4. Four courses of base stitches 141 to 144 are shown. Rows of pile stitches 149, 150, constructed as explained with reference to the pile stitches of FIG. 1, have sinker loops 149a, 150a forming a pile on the back of the fabric. As in the embodiment of FIG. 2, only every second course of the base fabric associated with a row of pile stitches which have sinker loops at the back of the fabric.

Every course 141 to 144 of base stitches is correlated with additional pile stitches 145 to 148 which have sinker loops 145a to 148a forming pile loops on the front of the fabric, and being constructed as described with reference to the additional pile stitches 125, 126 shown in FIG. 2. In alternate courses, three nedle loops, and two needle loops, respectively, are superimposed. For example, the needle loop of base stitch 141, the needle loop of additional pile stitch 145, and the needle loop of the pile stitch 149 are superimposed, whereas only the needle loops of base stitch 142 and aditional pile stitch 146 are superimposed in the same course, and formed together.

Figure 5:
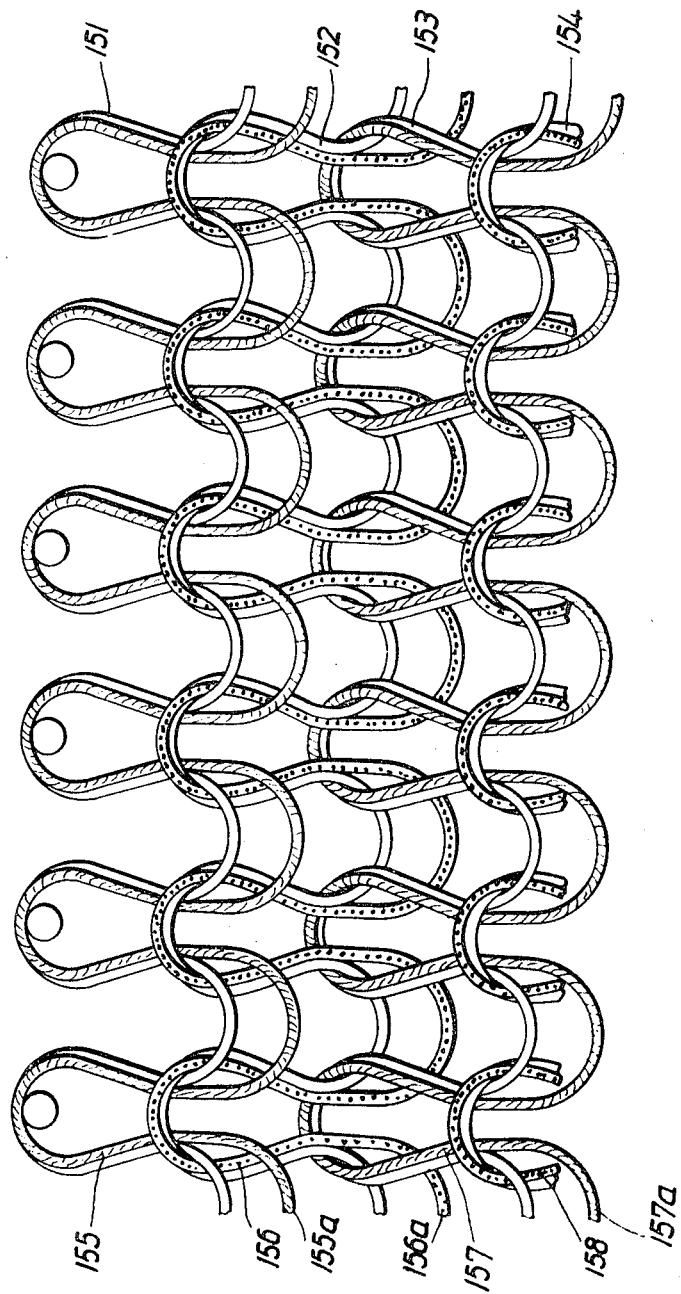
FIG. 5 is a schematic view illustrating a pile fabric according to a fifth embodiment of the invention in which alternating course of the base fabric support front and rear pile stitches.

FIG. 5 illustrates another pile fabric of the invention with piles on both sides and suitable for terry cloth. Four courses of base stitches 151, 152, 153, 154 of a plain base fabric are shown. A row of first pile stitches 156, 158 is connected and knit to every second course of base stitches and has sinker loops 156a, for example, forming a pile on the back of the base fabric. A row of second pile stitches 155, 157 is tied to every alternate course of base stitches and has sinker loops 155a, 157a forming a pile on the front of the base fabric.

Referring particularly to one first pile stitch 156, it will be seen that its needle loop passes in front of the needle loop of a base stitch 151 and under the sinker loop parts of the same, while being in front of the needle loop of a base stitch 152 of a second course of the base fabric. The legs of a respective pile stitch 156 pass over and in front of the needle loop of a base stitch 153 and under the legs of the same to form the sinker loop 156a. It will be seen that sinker loop 156a is held on the back of the fabric since it is located under the legs of base stitch 153 which holds sinker loop 156a on the back of the fabric.

Figure 5A:
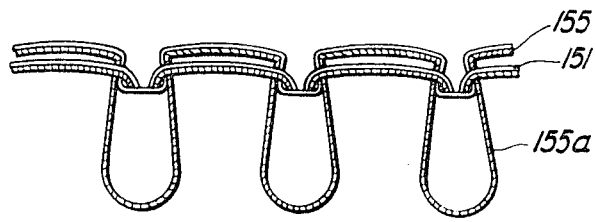
FIG. 5a is a fragmentary sectional view taken in the first course of the fabric of FIG. 5.
Figure 5B:
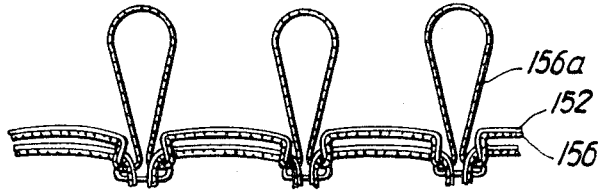
FIG. 5b is a fragmentary sectional view taken in the second course of the fabric of FIG. 5.

FIG. 5a illustrates the position of sinker loops 155a forming the pile on the front of the fabric, while FIG. 5b illustrates the sinker loops 156a which form a pile on the back of the fabric.

The pile fabrics described with reference to FIGS. 1 to 5 can be modified by providing pile yarns of different color, quality and texture, and the pattern of the pile stitches may be further modified.

Apparatus for knitting the pile fabrics described with reference to FIGS. 1 to 4 will now be described with reference to FIGS. 6 to 29 in which the yarns of the base fabric are designated by the reference character a, the yarns of the first pile stitches which form pile loops on the back of the fabric are designated by reference character b, and the yarns of the second pile stitches which form pile loops on the front of the fabric are designated by reference character c.

This will be best understood with reference to the following table:

| Pile fabric | Base yarn a | 1 Pile yarn b | 2 Pile yarn c |
| --- | --- | --- | --- |
| FIG. 1 | 111–114 | 115–118 | |
| FIG. 2 | 121–124 | 127, 128 | 125, 126 |
| FIG. 3 | 131–133 | 137–139 | 134–136 |
| FIG. 4 | 141–144 | 149, 150 | 145–147 |

Figure 7:
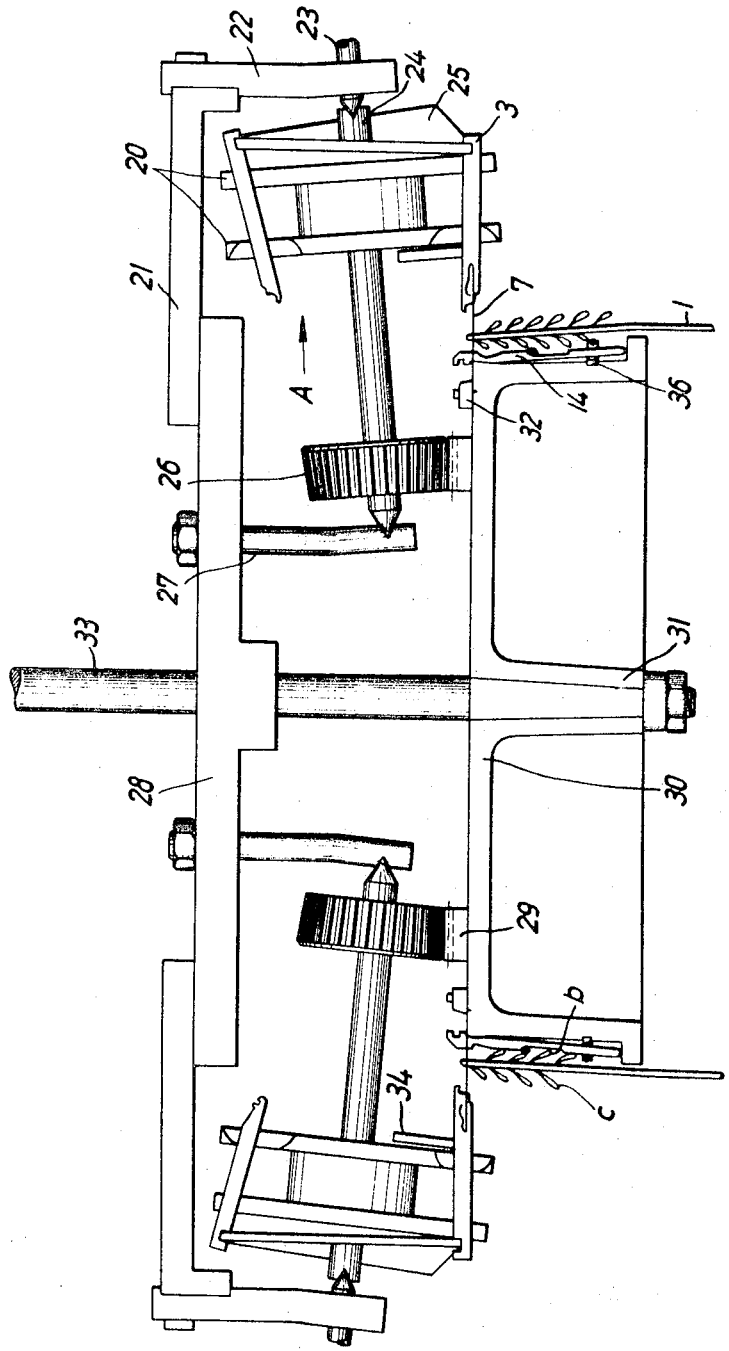
FIG. 7 is a schematic vertical sectional view illustrating a machine provided with the apparatus of FIGS. 6a and 6b.

FIG. 7 illustrates a machine on which the pile fabrics shown in FIGS. 1 to 4 are knitted. A circular carrier 28 is supported by a shaft 33 and has supporting brackets 21, 22 and 27 located at diametrical points for supporting shafts 24 of sinker wheels 20 which are driven by gears 26 meshing with a gear ring 29 on the rotary member 30. Each sinker wheel 20 includes two circular plates with radial slots in which sinkers 3 are mounted for longitudinal movement in radial direction of shaft 33, and for angular movement in axial direction relative to shaft 43, and in radial direction relative to the respective shaft 24. Sinkers 3 of each sinker wheel 20 are arranged in a circle and have at the outer ends thereof, recesses receiving a cam plate mounted on the respective shafts 24 and being slanted to shafts 24 to cause longitudinal movement of sinkers 3 in the manner of a wobble plate. Cams 34, see FIG. 8, control the transverse movement of sinkers 3 during rotation of the sinker wheels 20.

Bearded needles 7 are arranged in a circle on supporting body 30 and project outwardly in radial direction. All needles are fixed by clamping means 32 and rotate along a circular path. The number of needles 7 is in the same ratio to the number of teeth of gear ring 29 as the number of sinkers 3 and guide slots for the same in sinker wheels 20 so that during rotation of the machine, the sinkers 3 successively enter the gaps between needles 7.

Figure 12:
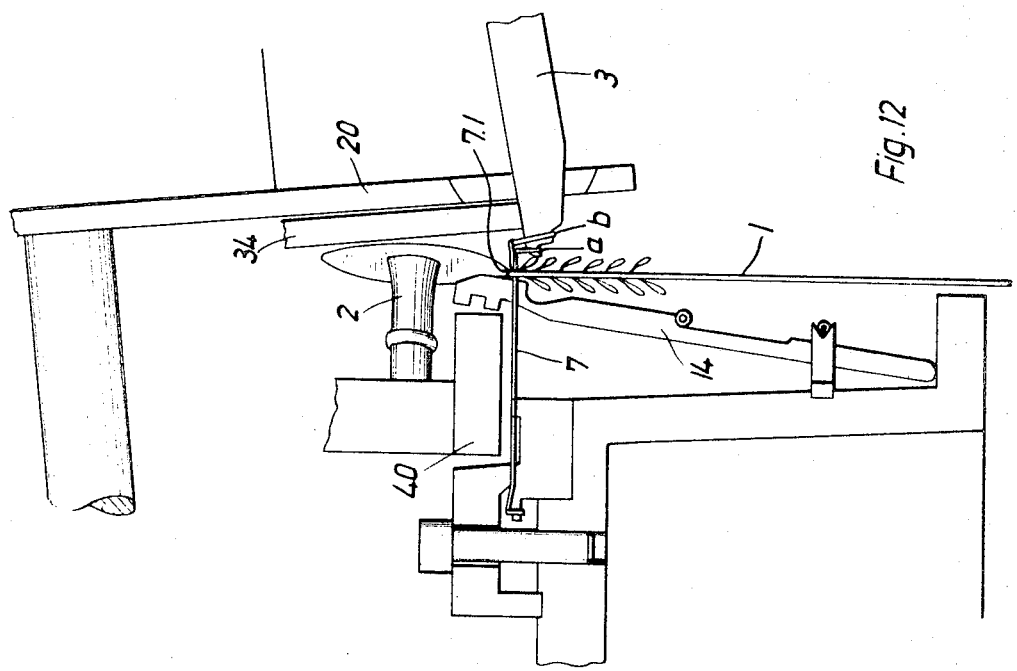
Figure 15:
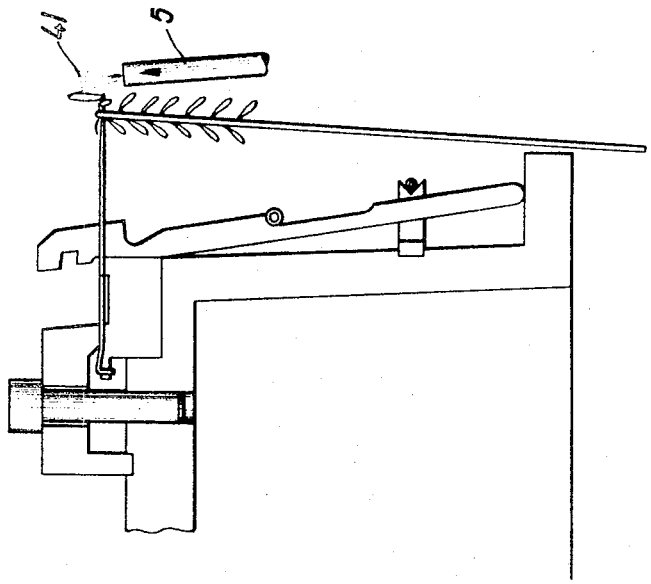

The supporting body 30 has circumferentially spaced, axially extending peripheral slots in which knock-over bits are mounted. The lower ends of the knock-over bits 14 are loosely supported so that the knock-over bits can move between the position shown in FIGS. 9 and 12, and the position shown in FIG. 19. Each knock-over bit is located in a gap between two needles and movable toward and away from the needle beard while being constrained by annular means 36. The radial movement between the positions of FIGS. 9 and 12 is effected by a circumferential cam 40 acting at the upper ends of knock-over bits 14.

As best seen in FIG. 8, the sinkers 3 mesh with needles 7 during rotation of sinker wheels 20 and the rotary supporting means 28, 30, 33.

As shown in FIG. 9, each sinker 3 has two staggered hook portions 3.1 and 3.2 located in the region of the yarns a and b which are supplied by yarn guides 38 and 37, as shown in FIG. 8. When cams 34 moves the meshing sinkers in axial direction of the supporting means 30, 28, 33, yarns a and b are taken by the hooks 3.2 and 3.1, respectively, and form two kinks of different size, as shown in FIG. 8. The kinks of the yarn a of the base fabric are smaller than the kinks of the pile yarn b.

Figure 11:
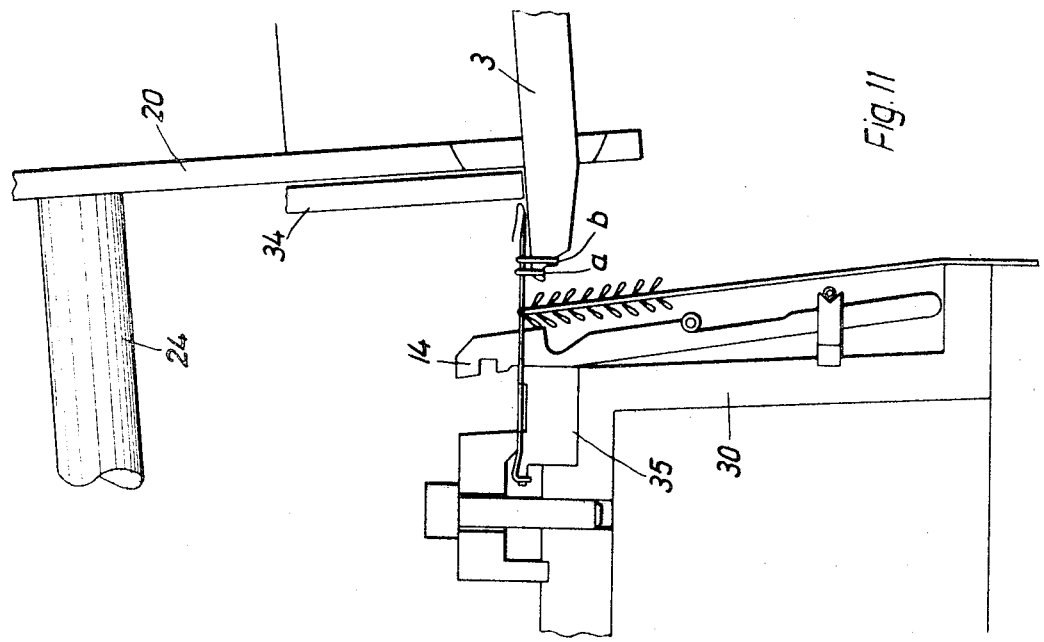
FIGS. 10, 11, 12, 13, 14, 15, 16 and 17 are sectional views corresponding to FIG. 9 but illustrating successive operational positions.
Figure 10:
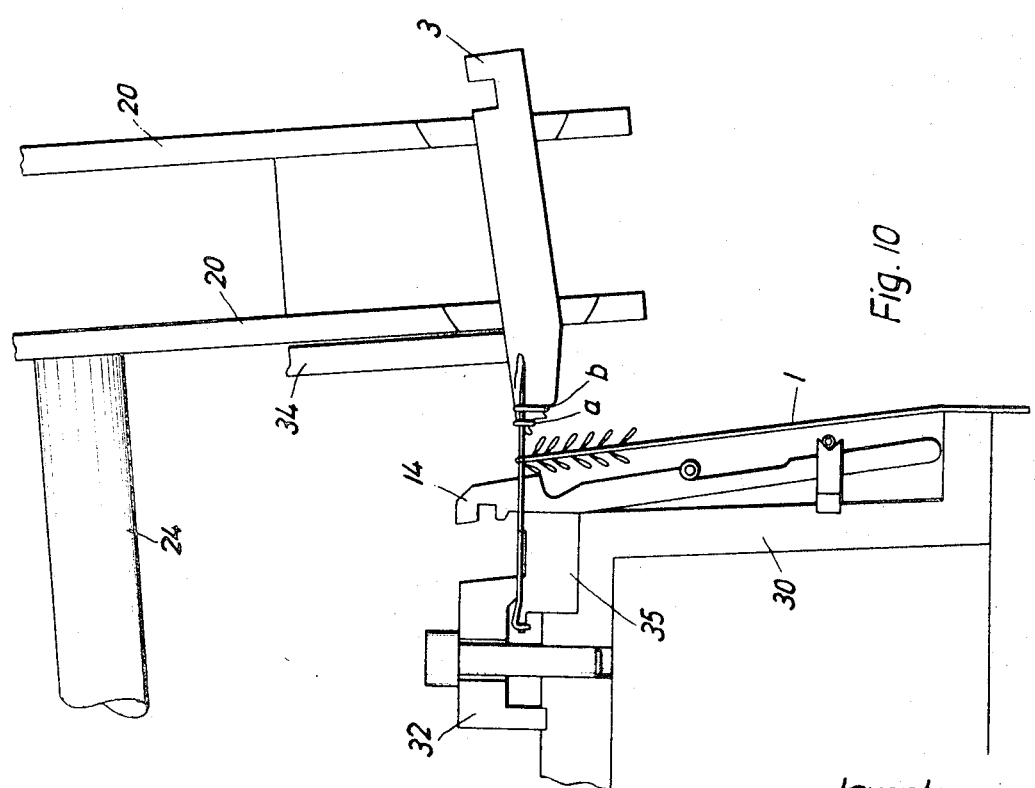

FIG. 9 illustrates an initial position, and FIG. 10 shows a position corresponding to FIG. 9 in which a sinker has pivoted downward under the action of cam 34 and formed kinks of different size of yarns a and b resting on the respective needles 7. In the position of FIG. 11, the kinks are expanded to full size.

Figure 13:
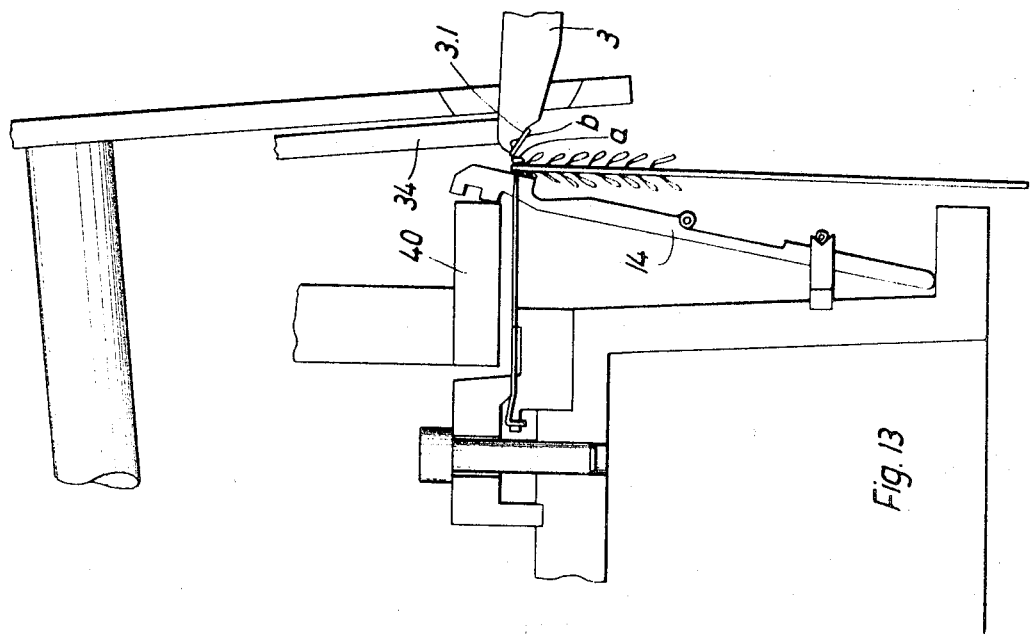

Circumferential cam 40 is now effective to move the knock-over bit 14 outward toward the region of fabric 1 and sinkers 3. At the same time, the respective sinker 3 is retracted in outward direction to the position shown in FIG. 12 and slides the yarns *a*, *b* on the respective needle 7 into the open beard of the needle whereupon the presser wheel 2 becomes operative to press and close the beard 7.1 of the respective needle 7 so that the last loop of fabric 1 can be moved onto the needle beard by the knock-over bit 14, as shown in FIG. 13.

In the following position of FIG. 13, sinker 3 is further retracted by cam 25, see FIG. 7, so that its hooks are located outward of the respective needle 7. The sinker loop of yarn *a* is released, but the sinker loop of yarn *b* held by hook 3.1 is pulled outward to the position shown in FIG. 14 in which knock-over bit 14 has returned to its inner inoperative position.

If the pile forming sinker loop of pile yarn *b* would be left on the outside of the fabric, the pile would be formed on the left side of the fabric, and in accordance with the prior art, the old loops of the fabric would now be knocked over.

In accordance with the present invention, the operations illustrated in FIGS. 6*a*, 6*b* and 15 to 23 follow for the purpose of placing the pile forming sinker loop of pile yarn *b* on the right side or back of the fabric which is the side of fabric 1 facing the knock-over bits 14.

Figure 14:
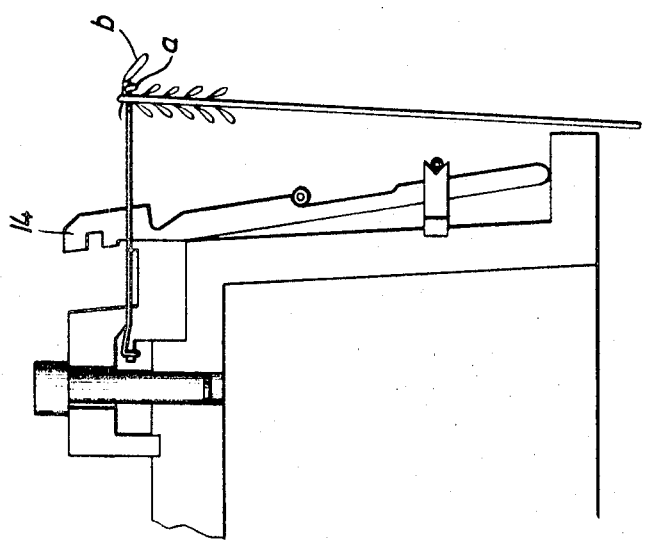

As shown in FIGS. 6*a*, 6*b* and 14, the sinker loops of pile yarn *b* project outward and downward while the needles continue the circumferential movement. The sinker loop of pile yarn *b* enters the region of a nozzle 5 which blows a stream of air 41 in upward direction to turn the loop to the upright position shown in FIGS. 15 and 6*b*. Further rotational movement brings the loops into the region of a substantially horizontal nozzle 8 which blows a stream of air 42 in horizontal direction against the loop so that the same turns from the broken line position shown in FIG. 16 to the solid line position projecting inward from the fabric and located on the back of the fabric, as also shown in FIG. 6*a*.

Figures 17, 17A:
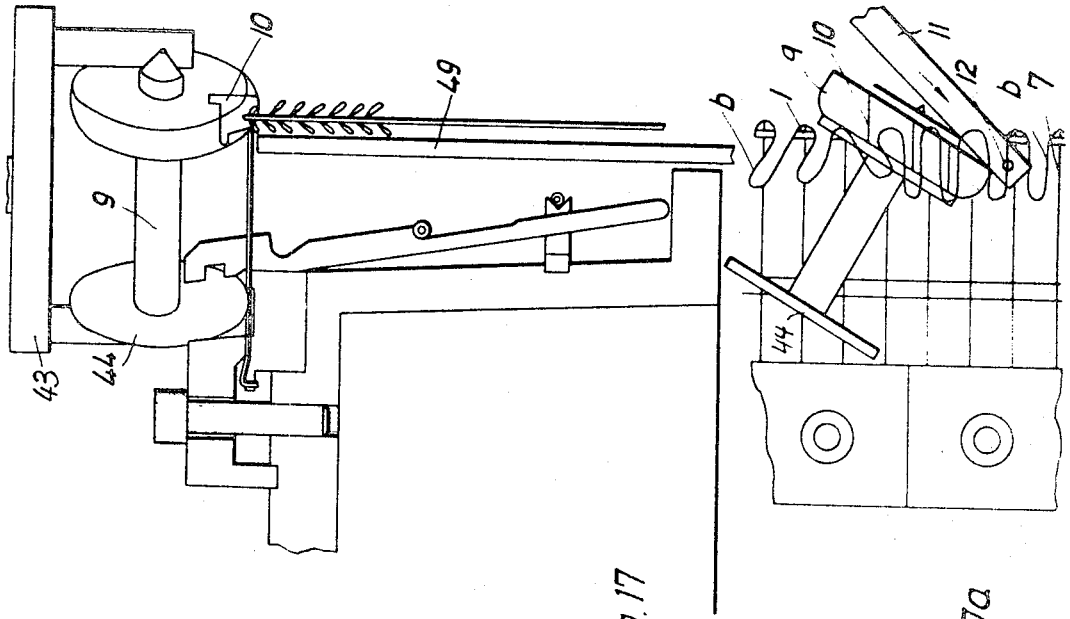
FIG. 17a is a fragmentary plan view of apparatus shown in FIG. 17.
Figure 16:
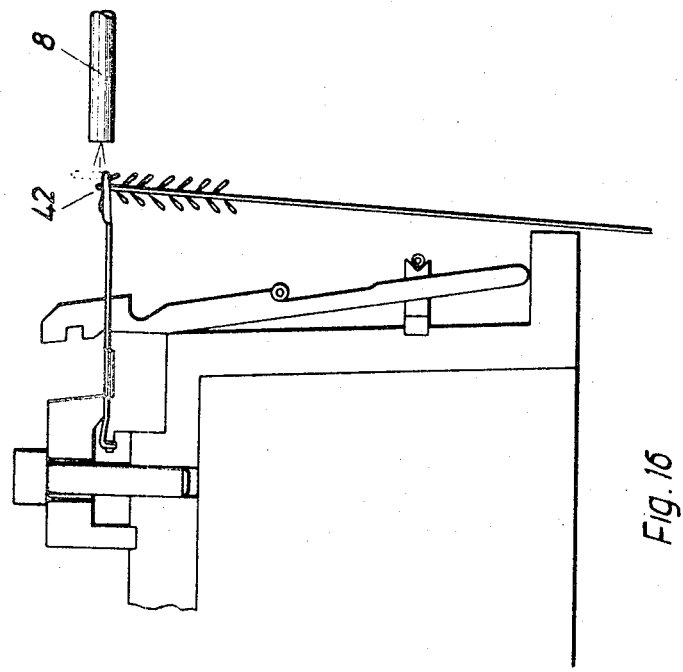

However, the turned loops of pile yarn *b* are somewhat irregular and have to be straightened out before they can pass between adjacent needles. A loop wheel 9 having sinkers 10 about the peripheral thereof is arranged in a slanted position in relation to the needles 7, as best seen in FIG. 17*a* and is driven by a gear 44 on its shaft which is supported on bracket means 43, as shown in FIG. 17. Gear 44 has teeth meshing with needles 7 so that loop wheel 9 is rotated in synchronism with the needle movement so that sinkers 10 enter successively into the gaps between the needles and straighten the loops of pile yarn *b* until they are located over the gaps between adjacent needles, as best seen in the lower portion of FIG. 17*a*. In this region, a stop plate 49, see FIG. 17, follows the peripheral contour of rotary body 30 and is located inwardly of the fabric 1 so that the same is not inwardly displaced by the operation of the sinkers 10 of loop wheel 9.

Figure 18:
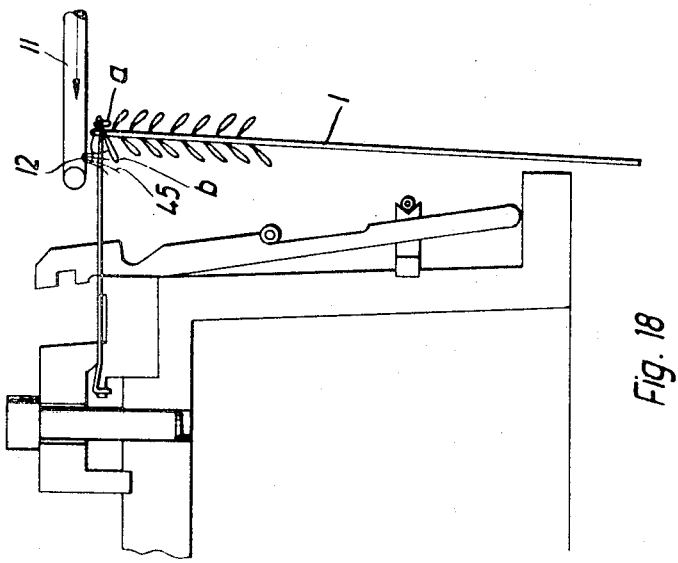

It is now possible to push the sinker loops of pile yarn *b* downward by an airstream 45 emitted from an opening 12 in a nozzle 11, as shown in FIG. 18, each loop being now bent downward to a position located below the needles 7.

Due to the downward slant of the loops, they can be turned further down to a downwardly projecting position by operation of the knock-over bits 14 which are operated in this region by a circumferential cam including cam track portions 15 to 18 engaging a cam follower recess 14.1 at the upper end of knock-over bit 14.

Figure 19:
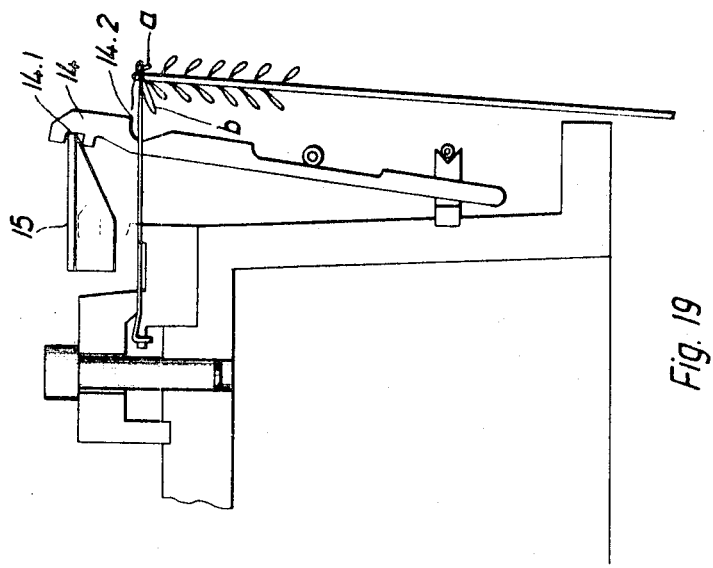
FIGS. 18, 19, 20, 21, 22 and 23 are vertical radical sections corresponding to FIG. 9 and illustrating further operational positions of the apparatus.
Figure 21:
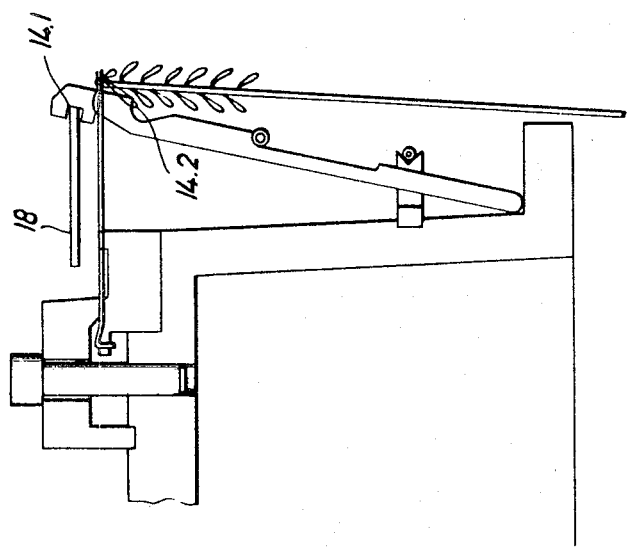
Figure 20:
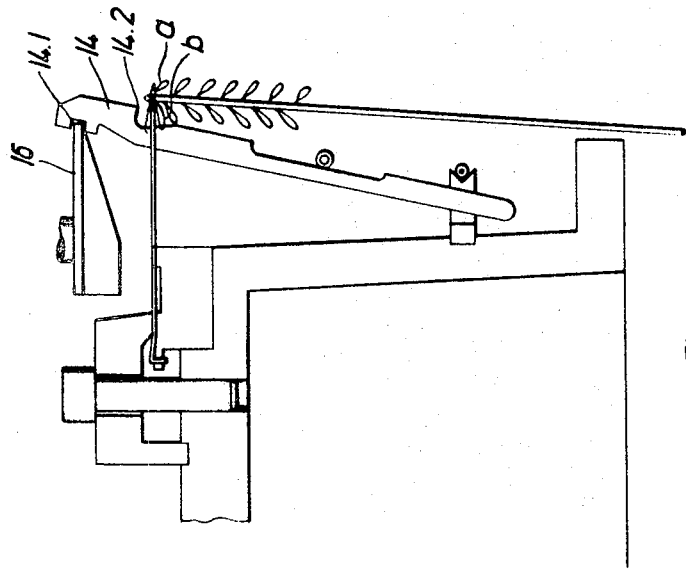
Figure 23:
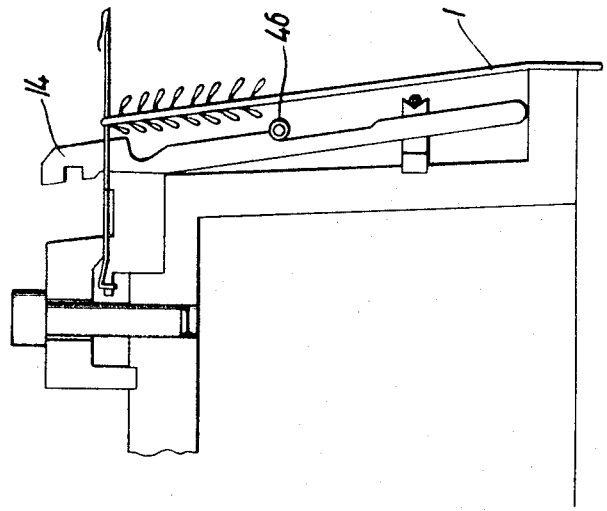
Figure 22:
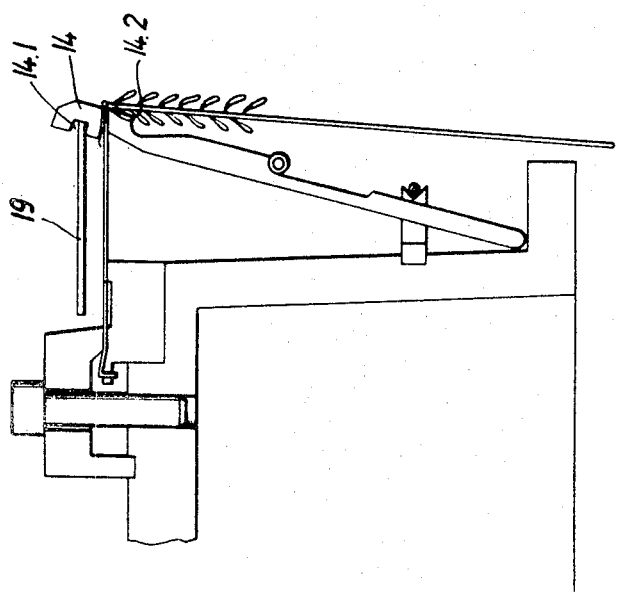

Cam track portion 15 moves successive knock-over bits 14 in outward direction to the position of FIG. 19 while raising the same to a height in which the hook portion 14.2 is located above the plane of the needles 7. In the position of FIG. 20, cam track 16 further raises the knock-over bit and moves the same toward the fabric. In the position of FIG. 21, cam track portion 18 lowers the knock-over bit so that hook 14.2 engages the turned over sinker loop of pile yarn *b* until the final position of FIG. 22 is reached under the control of cam track portion 19. In this position, the knock-over bit 14 knock the old loops of fabric 1 which were suspended on the outside of the beard, over the needle loops of base yarn *a* and pile yarn *b* held under the beard of the needle. Since the new sinker loop of pile yarn *b* is held by hook 14.2 of knock-over bit 14, it is not influenced by the knock-over operation after which the knock-over bit 14 is returned to its normal inner position shown in FIG. 23.

By the operations described with reference to FIGS. 9 to 23, a pile fabric as shown in FIG. 1 can be produced which has pile forming sinker yarns on the right side or back of the plain base fabric.

When a pile fabric according to the invention having a first pile on the back of the fabric, and a second pile on the front of the fabric is to be produced, the machine is adapted for the operation by the provision of sinkers 3′ having three hooks 3.1′, 3.2′, and 3.3′, as shown in FIGS. 24 and 25 which respectively correspond to FIGS. 8 and 9. It will be seen that the sinkers 3′ are movable in slots 39 of sinker wheels 20, and that sinker hook 3.2′ cooperates with the base yarn *a*, sinker hook 3.1′ cooperates with pile yarn *c*, and sinker hook 3.3′ cooperates with pile yarn *b*. Pile yarn *b* is to form pile loops on the right side or back of the fabric, as explained with reference to FIGS. 14 to 21, while pile yarn *c* is to form pile loops on the left or front of the fabric.

Figure 27:
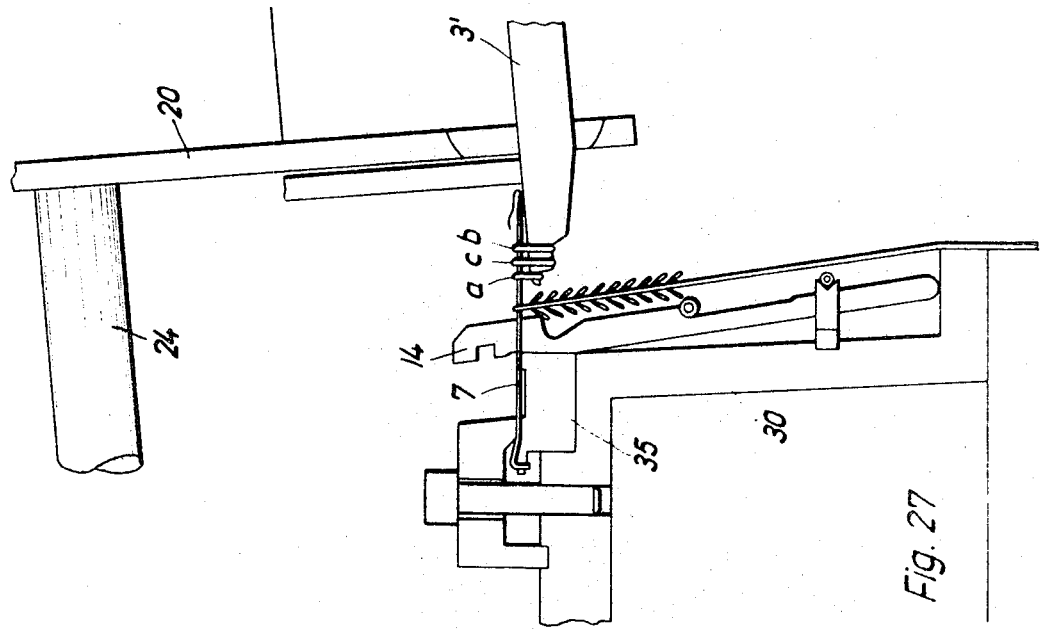
Figure 26:
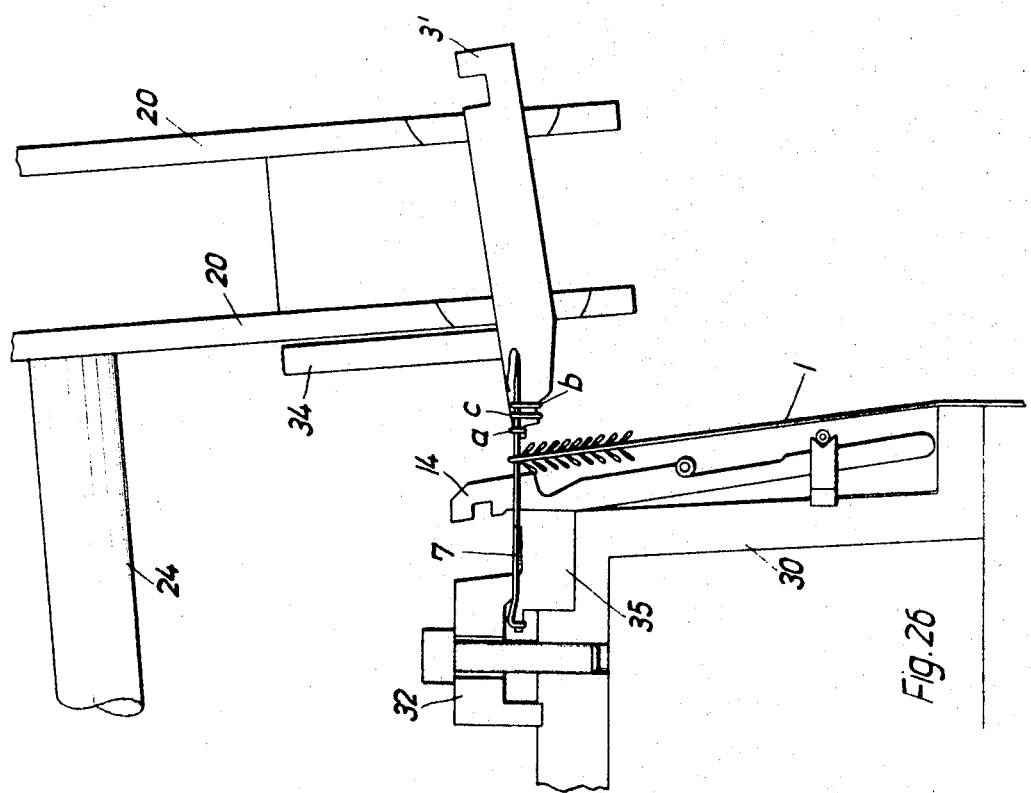
Figure 29:
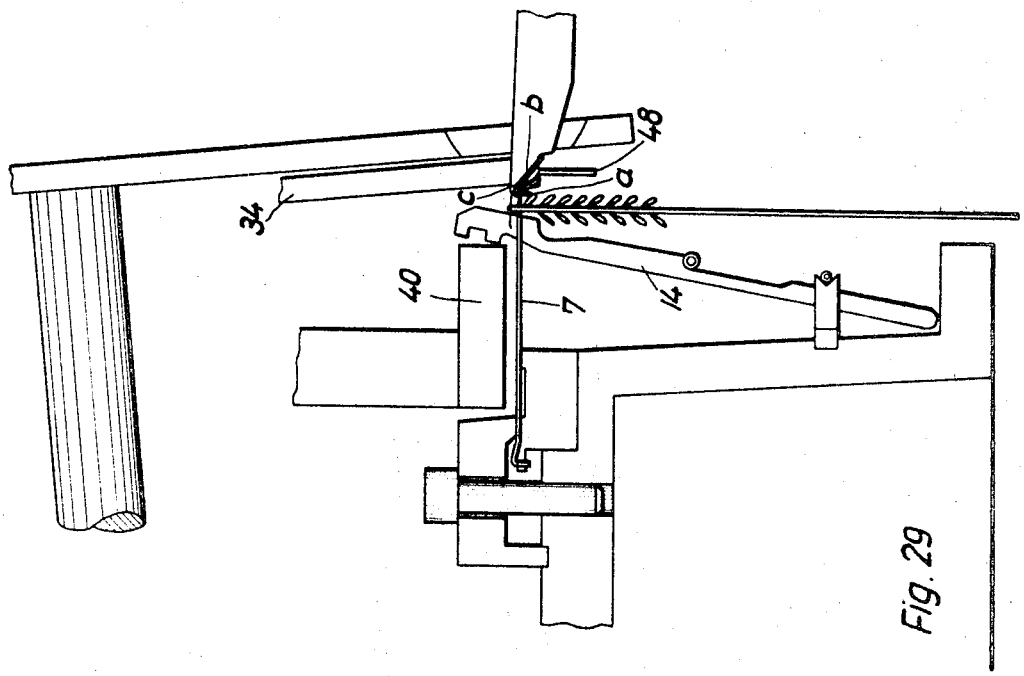
Figure 28:
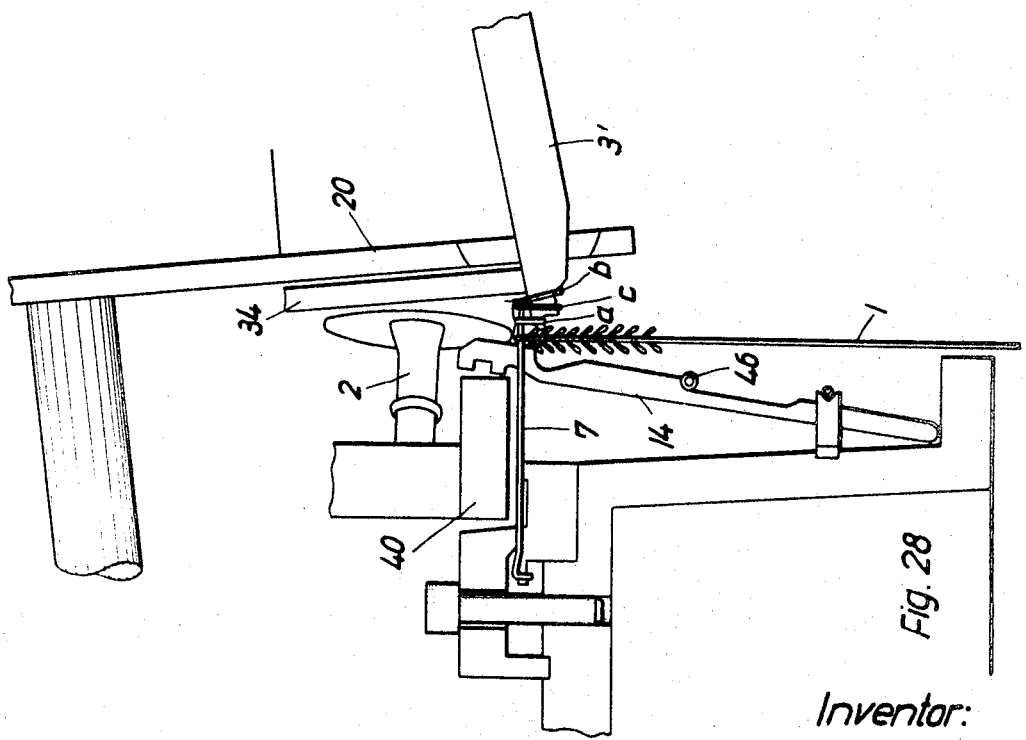

The formation of sinker loops by sinkers 3′ under the control of cam 34 is shown in FIGS. 26 and 27, which correspond to FIGS. 10 and 11. However, each sinker 3′ forms, in addition to the sinker loop of the base yarn *a*, two sinker loops or kinks of pile yarn *c* and *b*. The position of FIG. 28 corresponds to the position of FIG. 12 since knock-over bit 14 pushes the fabric loops over the press beards of the needles to the position of FIG. 29 which shows a separator plate 48 disposed between the sinker loops of pile yarns *c* and *b* held by sinker 3′.

The following operations are identical with the operations described with reference to FIGS. 14 to 23, and FIGS. 6*a* and 6*b*. By the air jets produced by nozzles 5, 8 and 11, the sinker loops of yarn *b* are turned over to be located on the back of the fabric, while the smaller sinker loops of pile yarn *c* remain on the front of the fabric since the shielding plate 48 prevents an action of the air jets on the sinker loops of pile yarn *c* in a position corresponding to the position of FIG. 15.

Figure 31:
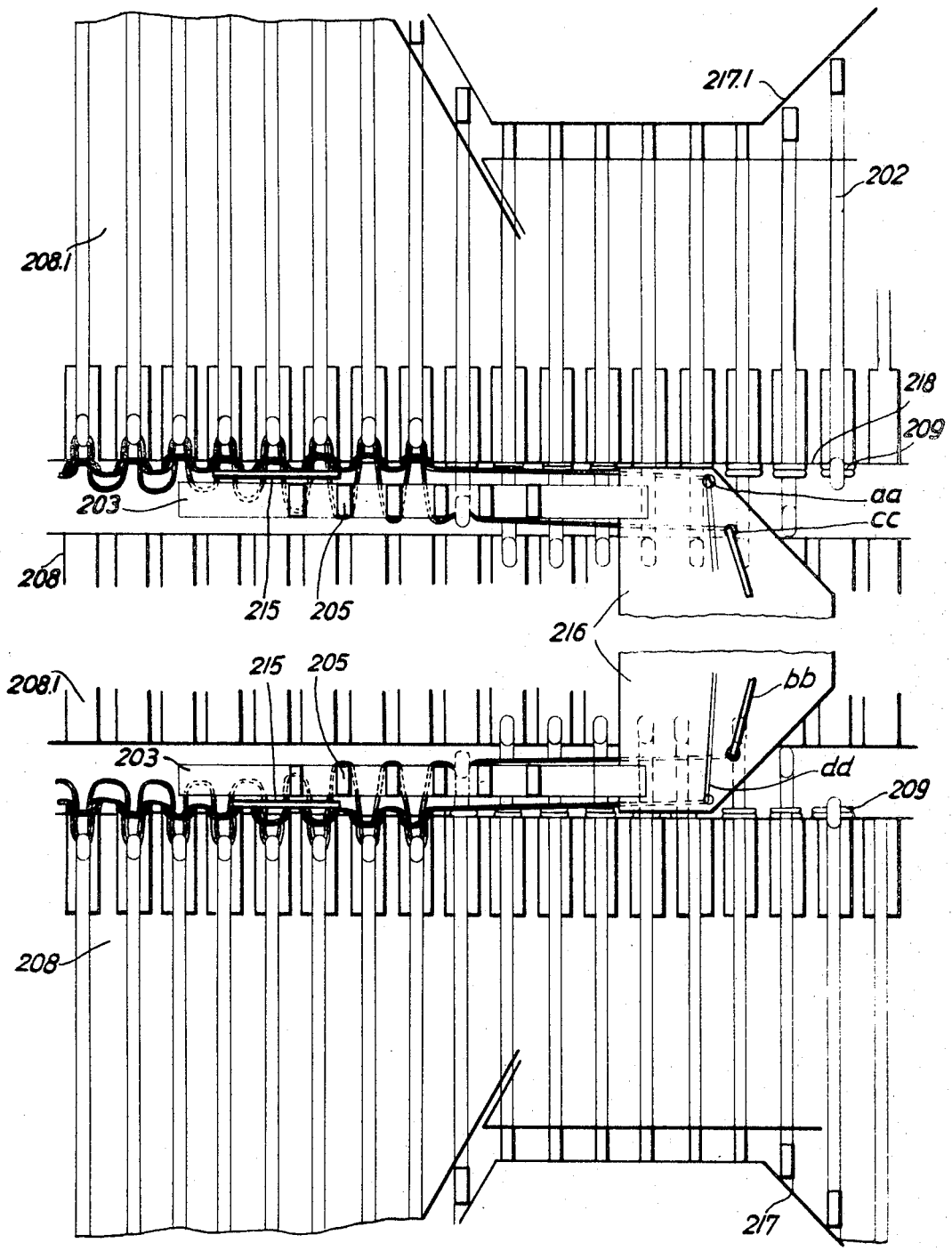
FIG. 31 is a developed axial sectional view in the direction of the arrow B in FIG. 30.

A pile fabric of the type shown in FIG. 5 can be knitted on the circular knitting machine shown in FIGS. 30 and 31 which can be used for making a rib fabric and terry cloth.

The machine has two coaxial needle cylinders 208 and 208.1 which respectively have supporting rings 214 and 214.1 and are driven to rotate in synchronism about a common axis so that axially extending circumferentially spaced slots 206 and 206.1 remain aligned. Double needles 202 are mounted for movement in aligned slots 206 and 206.1 and are operated by jacks 204, 204.1 for making knit and purl loops.

Cam boxes 211 and 211.1 are suported by supports 212 and 212.1 and have slanted cams 217, 217.1 cooperating with the butts of jacks 204, 204.1 by which the needles 202 are moved from one cylinder to the other. Loops are formed with the aid of sinker wheels 203 having circumferentially arranged radially projecting sinkers 205 and are rotatably mounted in bearings 213 supported by the cam box 211. The sinkers 205 project into the gap between the needles, meshing with the same so that the sinker wheels 203 are rotated during rotation of the cylinders.

The tubular rib fabric produced by the machine moves downwards in needle cylinder 208 and is wound up by means which are conventional and not illustrated.

The knitting of a pile fabric according to FIG. 5 will now be explained with reference to FIG. 31. The base fabric is knitted of yarns *aa* and *dd,* and the piles on both sides of the base fabric are respectively produced by yarns *bb* and *cc.* Yarns *aa* and *cc* form the outward course, while yarns *bb* and *dd* form the inner courses.

During rotation of the needle cylinders, cams 217.1 act on jacks 204.1 to move the needles. The yarns *aa* and *cc* are separated from each other by the yarn guide 216 so that the yarn *aa* remains on one side of the sinker wheel 203, while the yarn *cc* is transported beyond the same. When the needles are moved back in the opposite direction, the yarn *cc* forms a sinker loop on a sinker 205, while the yarn *aa* forms a sinker loop on a sinker portion 218 of the cylindrical cam box. Consequently, the sinker loop of yarn *cc* is greater than the sinker loop of yarn *aa,* and since both sinker loops are tied into the same needle loop, the pile yarn *cc* forms pile loops on the outside of the tubular fabric. A knock-over means 215 knocks the loops over the closed latch needles. The lower portion of FIG. 31 illustrates the loop forming operations which take place in the opposite direction whereby pile loops are formed on the inside of the tubular fabric of the yarn *dd.*

It will be understood that each of the elements described above, or two or more together, may also find a useful application in other types of pile fabrics differing from the types described above.

While the invention has been illustrated and described as embodied in a pile fabric having pile loops turned over from one side of the fabric to the other and being firmly knitted into a base fabric, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Pile fabric comprising a base fabric including courses of base stitches having needle loops, two sinker loop parts, and legs connecting said sinker loop parts with said needle loops, said courses forming groups including first, second, and third courses of base stitches; and at least one row of pile stitches knitted into the base stitches respectively, of at least one group of courses of base stitches, each pile stitch having an anchoring needle loop, sinker loop parts, and legs connecting said sinker loop parts with said anchoring needle loop, each anchoring needle loop being wound together with a needle loop of said second course from one side of the needle loop to the other side of the sinker loop parts of a base stitch of said first course, said legs of each pile stitch extending from said other side through the needle loop of a base stitch of said third course and being wound from said one side over the sinker loop parts of said base stitch of said second course to said other side so that the sinker loops of the base stitches of said second course cross said legs of the respective pile stitches on said one side and hold said sinker loops of said pile stitches on the other side of said base fabric for forming a pile of said other side.

2. Pile fabric as claimed in claim 1 wherein all said needle loops of all said courses of base stitches pass on said one side over the needle loops of the base stitches of the adjacent course, and on said other side over the sinker loops of the respective base stitches; and wherein said other side is the back of the base fabric.

3. Pile fabric as claimed in claim 1 wherein said base stitches of said first, second, and third courses are located in the same wale as the pile stitch which is knitted into the same.

4. Pile fabric as claimed in claim 1 wherein the three courses of each group are also courses of another staggered group of three base stitch courses; and wherein a row of pile stitches is knit into the courses of each group so that the sinker loops of the base stitches of each course of base stitches are located on said one side and hold the sinker loops of the respective pile stitches on said other side whereby the pile is only on said other side of said base fabric.

5. Pile fabric as claimed in claim 4 comprising rows of additional pile stitches having anchoring needle loops knit into the base stitches of each course of base stitches and having sinker loops projecting from said one side of said fabric and forming another pile on said one side of said base fabric.

6. Pile fabric as claimed in claim 1 wherein the anchoring needle loops of the pile stitches of each row are knit into the base stitches of every second course of base stitches; and comprising rows of additional pile stitches having anchoring needle loops knit into the base stitches of the respective remaining alternate courses of base stitches and having sinker loops projecting from said one side and forming a pile on said one side of said base fabric.

7. Pile fabric as claimed in claim 6 comprising rows of additional pile stitches knit into the base stitches of each course of base stitches, the sinker loops of alternate rows of additional pile stitches projecting from said one side and from said other side, respectively, and forming piles on the same in addition to the pile formed on said other side by the sinker loops of said pile stitches which are knit into every second course of said base fabric.

8. Knitted pile fabric comprising courses of knitted base stitches having needle loops, two sinker loop parts, and legs connecting said sinker loop parts with said needle loops, the needle loops of every second course of base stitches passing on one side of said base fabric over the needle loops of the base stitches of the remaining alternate course, respectively, and on the other side of said base fabric under the sinker loops of the respective base stitches, and the needle loops of the remaining alternate courses passing on said other side of said base fabric under the needle loops of said second courses and on said one side of said base fabric over the sinker loops of the respective base stitches; and a row of pile stitches knit into each course of base stitches, each pile sttich having an anchoring needle loop, sinker loop parts, and legs connecting said sinker loop parts with said anchoring needle loops, the legs of the pile stitches in alternate courses passing from said other side of said one side, and from said one side to said other side of the needle loops of the base stitches of alternate courses of base stitches so that the sinker loops of alternate courses alternately project from said sides of the base fabric and are held by the sinker loops of the respective alternate courses of base stitches.

9. The method of making a pile fabric comprising forming of a base yarn and of a pile yarn, stitches having needle loops, legs, and sinker loops; making the pile yarn sinker loops large and the base yarn sinker loops small; winding the pile yarn legs from the back of the fabric through superimposed needle loops of said yarns to the front of base yarn sinker loops; turning said pile yarn sinker loops to the back of the knitted fabric; and knocking over the needle loops of said base yarn and pile yarn so that the sinker loops of said base yarn hold said pile yarn sinker loops on the back of the fabric.

10. The method of claim 9 comprising moving a first stream of air parallel to said fabric for turning said pile yarn sinker loops into the plane of said fabric; moving a second stream of air from the front to the back of the fabric to move said pile yarn sinker loops to the back of the fabric; and moving a third stream of air on said back opposite to said first stream for turning said pile yarn sinker loops down.

11. The method of claim 9 wherein said pile yarn sinker loops are straightened on said back of said fabric and aligned with the gaps between needles forming said needle loop.

References Cited

UNITED STATES PATENTS

| | | | |
|---|---|---|---|
| 1,686,172 | 10/1928 | Porte | 66—194 |
| 1,777,699 | 10/1930 | McAdams | 66—8 |
| 2,936,601 | 5/1960 | Thibord et al. | 66—91 |
| 2,953,912 | 9/1960 | Hill | 66—9 |
| 3,021,698 | 2/1962 | Hill | 66—9 |
| 3,115,024 | 12/1963 | Walrabenstein | 66—9 XR |

FOREIGN PATENTS 590,937 1959 Italy.

RONALD FELDBAUM, Primary Examiner